May 27, 1924.      E. P. DU PONT      1,495,729

COMBINED LUBRICATION GUARD AND FEEDER

Filed Nov. 14, 1922

WITNESS:
Rob. R. Kitchel.

INVENTOR
Eleuthere Paul du Pont
BY
Frank S. Busser
ATTORNEY

Patented May 27, 1924.

1,495,729

UNITED STATES PATENT OFFICE.

ELEUTHERE PAUL DU PONT, OF MONTCHANIN, DELAWARE.

COMBINED LUBRICATION GUARD AND FEEDER.

Application filed November 14, 1922. Serial No. 600,828.

*To all whom it may concern:*

Be it known that I, ELEUTHERE PAUL DU PONT, a citizen of the United States, residing at Montchanin, county of New Castle, and State of Delaware, have invented a new and useful Improvement in Combined Lubrication Guards and Feeders, of which the following is a full, clear, and exact description, reference being had to the accompanying drawings, which form a part of this specification.

This invention relates to an improvement in connecting means for a combined guarded lubricant supply and the feed tube of a lubricant feeder, and is more particularly designed to lock the nipple and the feed tube to each other in devices such as shown in my Patent No. 1,368,250, issued February 15, 1921.

The precise nature of my invention will be best understood by reference to the accompanying drawings, which will now be described, it being premised, however, that changes may be made in the details of construction of the various parts without departing from the spirit and scope of my invention as defined in the appended claims.

Fig. 1 of the drawings is a face view of a nipple for delivering oil or a lubricant to an oil hole and an oil or lubricant supplying device.

Figure 1:
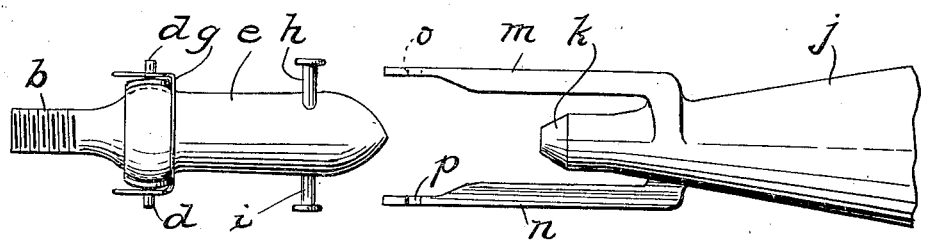

In the drawings, the reference character $b$ designates a nipple which may be threaded for securing it in a lubricant feeding opening in a bearing or other member to which a lubricant is supplied. The nipple $b$ is provided with a through opening the outer end of which is provided with a conical seat $c$. Rockably mounted on a through pin $d$ or pins projecting from opposite sides of a spherically shaped enlargement on the nipple is a split dust guard for the mouth of the nipple, formed of two shell-like members $e$ and $f$, and $g$ is a spring tending to hold the guard in its closed position over the mouth of the nipple. Extending laterally from the one side of member $e$ is a pin $h$, and extending from the member $f$ at the other side of the structure is a pin $i$. Thus far the structure is the same as the nipple disclosed in the above mentioned patent with the exception that each dust guard member is provided with only one pin instead of two, and the pin $d$ in the device above described is somewhat longer than the dust guard fulcrum pin of the patent for the purpose more fully hereinafter described.

Figure 4:
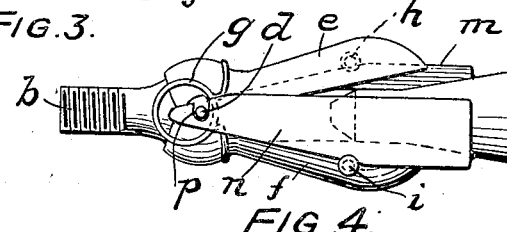
Fig. 4 is a face view of the two members in lubricant supplying relation.
Figure 5:
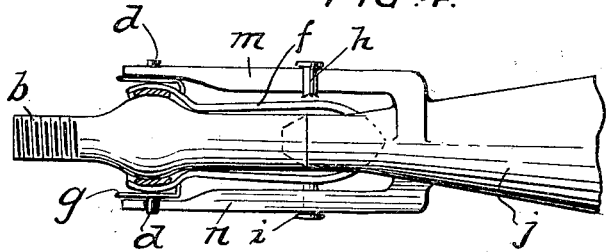
Fig. 5 is a similar view at right angles to Fig. 4.

The lubricant feeding device comprises a lubricant container having a body portion $j$, a nozzle $k$ having a conical seating portion adapted to engage the seat $c$ in nipple $b$ when the device is in feeding relation as indicated in Fig. 4.

Connected to the body $j$ and extending forwardly beyond the end of the nozzle $k$ are dust guard openers $m$ and $n$, the opener $m$ being arranged to engage pin $h$, while opener $n$ is arranged to engage pin $i$ on shell members $e$ and $f$, respectively.

The openers $m$ and $n$ are provided with notches $o$ and $p$, respectively, near their ends for engagement with the pin or pins $d$ for locking the feeder to the oil supply nipple.

Figure 2:
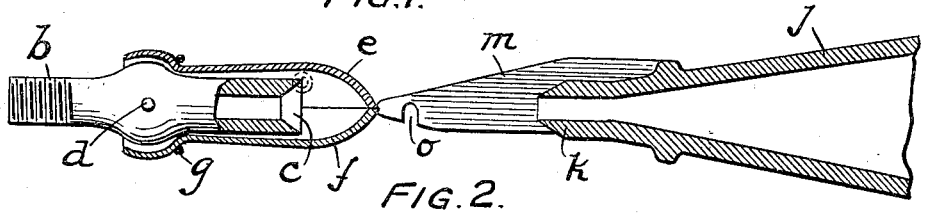
Fig. 2 is a sectional view through the devices shown in Fig. 1.
Figure 3:
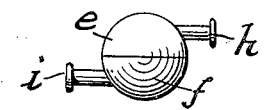
Fig. 3 is an end view of the nipple for the oil hole.

In connecting the feeder to the nipple $b$, the members are first brought to the position shown in Fig. 2, and the feeder is moved toward the nipple to separate the dust guard members $e$ and $f$ by the openers $m$ and $n$, respectively, while holding the feeder against rotation about the axis of the nipple and feeder by the pressure of the spring $g$. When the notches $o$ and $p$ are in line with pin or pins $d$, the end of the nozzle will be in engagement with seat $c$. The feeder is then rotated to seat the pins $d$ in notches $o$ and $p$ and the lubricant is forced from container $j$ into the nipple $b$. When the lubricant has been supplied to the nipple, the feeder is rotated to disengage pins $d$ from notches $o$ and $p$ and the feeder is withdrawn longitudinally from the nipple and dust cap, the latter of which is closed by the spring $g$ after the feeder has been withdrawn.

Figure 6:
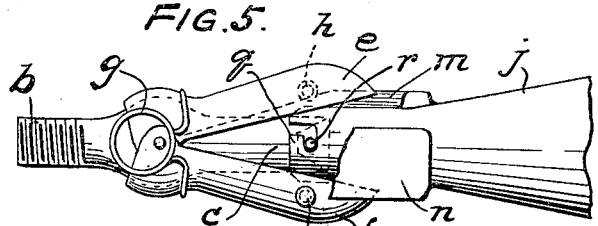
Fig. 6 is a view, similar to Fig. 4, with a portion broken away, showing another form of device.

In Fig. 6 I have shown another form in which the same reference characters have been applied to similar parts. In this form, the openers $m$ and $n$ are not provided with notches for engaging the pins $d$, but the nozzle $k$ is provided with a hood $q$ having a notch with an offset for engaging a pin $r$ on the side of the nipple, and when the two parts are secured to each other by the bayonet point the nozzle will be seated in the seat in the end of the nipple b.

In applying the feeder in this construction, the bayonet point is locked by the action of spring g, although the action may be reversed if desired.

The advantages of my invention result from the provision of a dust guard for a lubricating hole which is arranged to be automatically opened when the lubricant feeder is applied and automatically closed when the feeder is removed, and in which the feeder is locked in locking position when so applied.

Having now fully described my invention, what I claim and desire to protect by Letters Patent is:

1. Means for protecting a lubricant hole from dust and for feeding lubricant thereto, comprising a movable cover for the lubricant hole out of contact with the lubricant fed thereto, a lubricant feeding device, coacting elements on the cover and feeding device for uncovering the hole when the feeding device is moved into feeding relation thereto, and means for locking the feeding device in feeding relation to the hole when the feeding device is moved into such relation.

2. Means for protecting an oil hole from dust and for feeding oil thereto, comprising a dust cap formed of two members hinged to cover said hole when in one position and to uncover the said hole when in another position, an oil feeding device having a nozzle arranged to be aligned with the oil hole to feed oil thereto, and coacting means on the cover members and the oil feeding device for exposing the oil hole and permitting the nozzle to be aligned with the oil hole when the oil feeding device is moved into feeding position, and means for locking the oil feeding device in feeding relation.

3. A lubricator connection for joining an oil hole to an oil container, comprising a nipple adapted to connect with the oil hole and having an inlet mouth, an oil feeder having a discharge mouth, an external dust cover normally enclosing said inlet mouth and adapted to be opened in the application of the oil feeder to the nipple and to close when the oil feeder is removed from the nipple, the inlet mouth of the nipple and the discharge mouth of the oil feeder being shaped to afford a substantially oil tight joint when the two are brought into feeding relation, and means for locking the discharge mouth of the feeder within the inlet mouth of the nipple.

4. A lubricator connection for joining an oil hole to an oil container, comprising a nipple adapted to connect with the oil hole, an external spring-actuable cover normally closing the inlet, an oil feeder adapted to be positioned with its axis in line with the axis of the nipple and adapted when moved parallel to its axis to open the cover against its spring and register with the nipple to establish a closed path of flow for the oil, and a lock adapted to lock the oil feeder to the nipple by a rotary motion of the oil feeder about the axis of the nipple when the oil feeder is in engagement with the nipple.

5. A lubricator connection for joining an oil hole to an oil container, comprising a nipple adapted to connect with an oil hole and having an end opening, a pair of spring-actuated wings in hinged relation with the nipple and on opposite sides and extending beyond its end opening and normally in closed relation, projections on the wings, an oil feeder having a discharge end, wedges on the oil feeder adapted, in the movement of the feeder toward the nipple, to engage said wings and spread them apart, and a pin and slot locking device on the nipple and oil feeder arranged to engage each other by a rotary movement of the oil feeder when the discharge end of the oil feeder is in engagement with the nipple to lock the oil feeder to the nipple.

6. A lubricator connection for joining an oil hole to an oil container, comprising a nipple adapted to connect with the oil hole, a spring-actuable cover normally closing the end of the nipple, an oil feeder adapted to be positioned with its axis in line with the axis of the nipple and adapted when moved parallel to its axis to open the cover against its spring and register with the nipple to establish a closed path of flow for the oil, said oil feeder having a socket for receiving the end of the nipple, and a lock adapted to lock the oil feeder to the nipple by a rotary motion of the oil feeder about the axis of the nipple when the oil feeder is in engagement with the nipple.

7. A lubricant feeder for a nippled oil hole provided with a dust cap having separable members, said feeder having means for separating the dust cap members when moved into feeding relation, and means to lock the feeder in feeding relation to the oil hole.

8. A lubricant feeder for a nippled oil hole provided with a dust cap having separable members, said nipple having a socket member for the reception of the end of the feeder, means on the feeder for separating the dust cap members on the nipple when the feeder is moved into feeding relation to the nipple, and means for locking the feeder in feeding relation to the nipple.

In testimony of which invention, I have hereunto set my hand, at Wilmington, Del., on this 10th day of November, 1922.

ELEUTHERE PAUL du PONT.